United States Patent Office 2,700,089
Patented Jan. 18, 1955

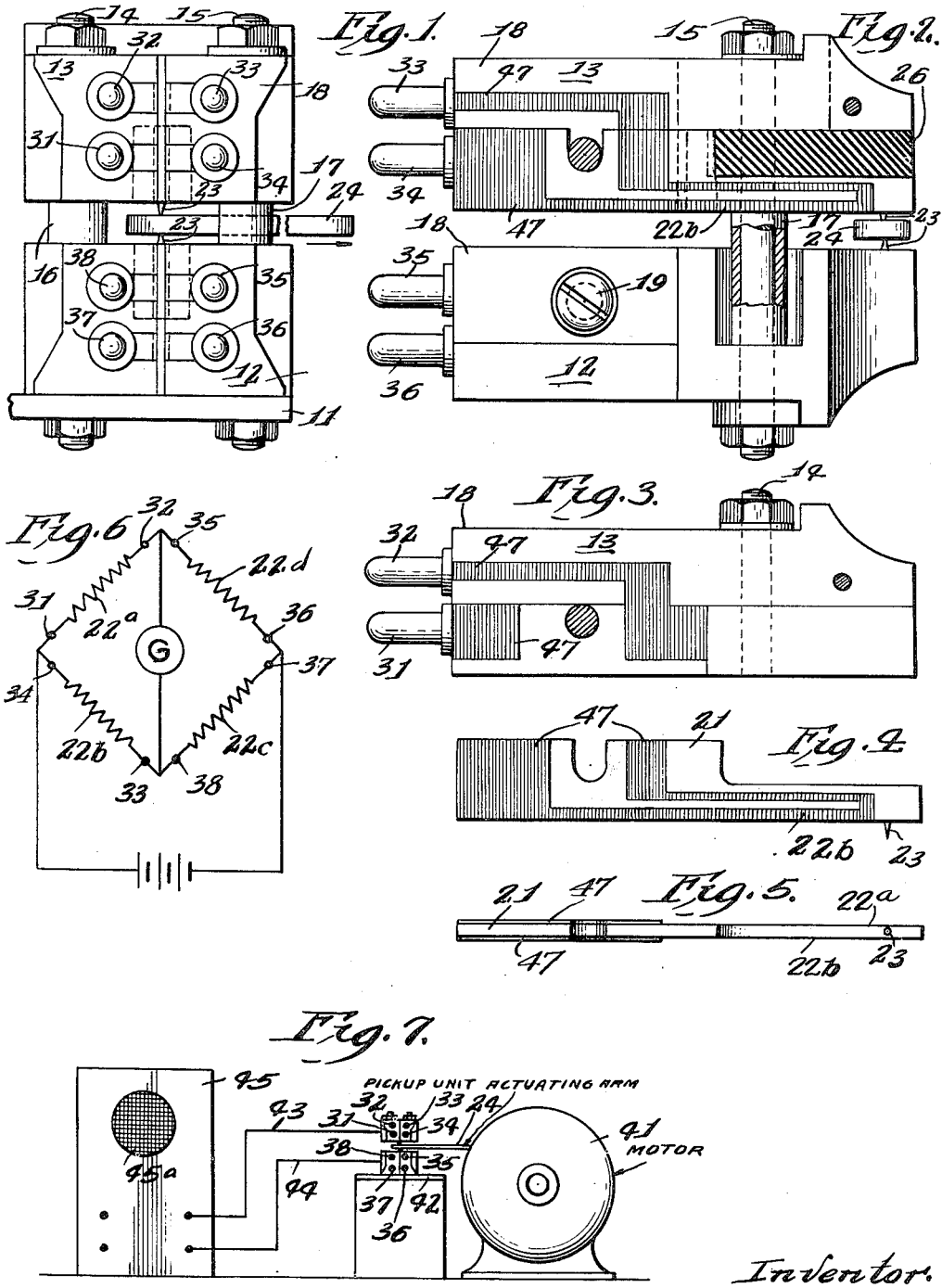

2,700,089

STRAIN-SENSITIVE TRANSDUCER

Robert S. John, Waukegan, Ill., assignor, by mesne assignments, to Pfanstiehl Chemical Corp., Waukegan, Ill., a corporation of Illinois Application November 28, 1950, Serial No. 197,935

1 Claim. (Cl. 201—63)

This invention relates to a device for translating mechanical vibrations into an electric current.

One feature of this invention is that it provides a simple means for detecting and determining the frequency of mechanical vibrations; another feature of this invention is that it provides a strain-sensitive coated vibrator-translator and associated circuits developing considerable voltage variations for a given mechanical movement; another feature of this invention is that it provides a means for utilizing a plurality of strain-sensitive elements in the measurement of a series of mechanical vibrations; another feature of this invention is that it damps out undesirable harmonic vibrations in the higher frequencies; a further feature of this invention is that it provides four strain sensitive resistance elements which may be connected in a circuit in any desired order.

Other features and advantages of this invention will be apparent from the following specification and the drawings, in which:

Fig. 1 is a back elevational view of the device showing the eight terminal prongs; Fig. 2 is a side elevational view, partly in section, of the vibrator-translator showing a beam-like contactor element held between a pair of end rods; Fig. 3 is a side elevational view, partially in section, of one of the mounting pieces for the strain-sensitive members; Fig. 4 is a side view of one of the strain-sensitive members; Fig. 5 is a top view of the strain-sensitive member shown in Fig. 4; Fig. 6 is a circuit diagram showing a bridge circuit for the resistance elements of the strain-sensitive members; and Fig. 7 shows the device being used to measure the vibrations of a motor with the mechanical vibrations being translated into an electric current and run through an amplifying device.

In my transducer device I employ a pair of strain-sensitive elements of the general type disclosed in U. S. Patent 2,380,514 to Germeshausen. This patent disclosed a vibration-translating device consisting of a stylus made of a flexible plastic, the sides of which were coated with a thin layer of graphite. When this stylus made contact with a vibrating surface, such as a phonograph record, the plastic flexed and bent the layer of graphite in a manner corresponding to the vibrations imparted from the record grooves. This bending changed the resistance of the graphite which formed part of an electrical circuit connected to an amplifying element. The amplifying element was in turn connected to a speaking device and, thus, it was the sensitivity of the strain-sensitive stylus which actuated the sound producing speaker.

In a later filed patent, 2,373,676, Germeshausen disclosed an improved strain-sensitive element for use as a phonograph stylus. In this patent, a vibrator-translator composed of insulating material of a low modulus of elasticity, such as Celluloid or polystyrene, had an elongated configuration. Both sides of the flexible portion of this element were coated with graphite in a form to give a single long resistance element. The general form of the strain-sensitive element disclosed in this Germeshausen patent is employed in the present invention, but each element includes two graphite resistors rather than one.

The device of this invention may be generally described as comprising two translator elements analogous to those heretofore used in phonographs, with the styli facing each other in congruent relationship, and maintaining therebetween an actuating arm utilized to contact a vibrating mechanism the vibrations of which are to be measured.

Referring to Fig. 1, the device may be seen to consist of a mounting arm 11 to which a pair of cartridges 12 and 13 are mounted by means of a pair of screws 14 and 15. A pair of spacers 16 and 17 on the screws 14 and 15 maintain the proper spacing of the cartridges 12 and 13.

Each of the cartridges 12 and 13 consists of a shell 18 composed of a non-conducting plastic material, such as Bakelite. This shell 18 may be cast in two parts which are held together by a screw 19 (Fig. 2).

The screw 19 also serves to maintain a strain-sensitive element 21 (Figs. 4 and 5) in place between the two halves of the shell 18. Each cartridge encases one of the strain-sensitive flexible members 21. As described in the Germeshausen Patent 2,373,676, the strain-sensitive members 21 consist of a flexible material, such as Celluloid or polystyrene. While the embodiment illustrated has two members 21 it is obvious that a single piece having two arms extending outward in a parallel direction would serve as well. A flexible metal could also be used provided it was coated with a non-conducting material. The flexing surface of each of the members 21 is coated with a thin layer of graphite 22a, 22b, 22c, or 22d. Whenever the flexing surface of one of the members 21 is bent the resistance offered by the graphite film changes. If an electric current is passed through this graphite film at this time, the voltage drop thereacross, or the current flow, or both, will be altered by this changed resistance. Thus, the mechanical bending of the strain-sensitive member 21 effects a corresponding change in an electric characteristic.

Each member 21 has an actuating element 23, here shown as a pivot rod, at its free end. The pivot rods 23 may be the usual stylus used on phonographs, but they need not have sharp points and do not have to be composed of metal.

The pivot rods 23 grip between them an actuating arm or contact element 24 (Figs. 1 and 2) which extends outward substantially at right angles to the flexing plane of the strain-sensitive members. While the actuating arm 24 is shown as pivoting around the pivot rods 23 it is obvious that this arm may be fastened with reference to the pivot arms and it may in fact be attached directly to the members 21 thereby eliminating the pivot rods 23. The actuating arm 24 is adapted to engage a vibrating surface. The arm 24 does not need to have any particular configuration or type of surface in order to function, but in certain vibration measurements it is desirable to have an adapter end designed for the particular workpiece being measured.

There is a graphite film on each side of the strain-sensitive members 21. These graphite films are insulated from each other and the entire apparatus thus contains four separate graphite films serving as resistance elements. Each end of each graphite resistance element is connected to one of a series of terminal prongs 31 to 38 by means of a conducting material 47, such as a coating of finely divided silver (Figs. 2 and 3). The prongs 31 and 32 and 37 and 38 at the left of each cartridge are the terminals for one pair of graphite resistance elements and the prongs at the right for the other pair of graphite resistance elements. Thus, there are eight terminal prongs 31 to 38 for the four graphite resistance elements 22a, 22b, 22c, and 22d.

In order to avoid resonance in the higher frequencies, it is desirable to provide a damping element 26 (Fig. 2) which is adjacent the free end of the strain-sensitive member 21. This is preferably a flexible material which impinges slightly on the strain-sensitive element 21. Good results will be achieved by using the same polystyrene material (but much more plasticized) for the damper 26 that is used for the strain-sensitive member 21. The presence of the damper 26 reduces the sensitivity of the device slightly and it is therefore preferable to have only a light contact between the members 26 and 21.

Fig. 6 illustrates a bridge circuit including the four graphite resistors 22a–d. These resistors may be connected through the terminal prongs 31 to 38 in any sequence desired. For a bridge circuit having maximum potential swing at the ends of a circuit of a galvanometer 27 all four strain-sensitive resistors are set up with their terminal prong connections as shown in Fig. 6. When the motion of the actuating arm 24 is to the right as indicated by the arrow in Fig. 1, the graphite resistors 22a and 22c between the terminal prongs 31—32 and 37—38 increase in resistance while the resistors 22b and 22d connected to the terminals 33—34 and 35—36 decrease in resistance.

The operation of the transducer is illustrated in Fig. 7. It is assumed that the amplitude and frequency of vibration of a motor 41 is undergoing a test. The transducer is positioned on a base 42 with its actuating arm 24 extended to contact the motor 41. The terminal prongs 31 to 38 are connected as shown in Fig. 6 and a pair of leads 43 and 44 connect the transducer to an indicator device 45.

The indicator device 45 may consist of an amplifier and cathode ray oscilloscope having an indicator face 45a. Both the amplifier and the oscilloscope may be of the type known to the art for many years.

The thickness of the graphite layers 22 on the strain-sensitive members 21 may be controlled to give a variety of resistances. For most applications, a resistance of about 60,000 ohms is satisfactory, but the layers may be increased in thickness to give resistances of 20,000 ohms or less. The device gives good results where the actuating arm 24 moves the pivot rods 23 as much as 0.050" off center at lower frequencies up to 1,000 cycles per second. For higher frequencies the swing must be less.

The electrical response is linear in amplitude up to about 25,000 cycles per second. The transducer can be made to deliver 10–15 millivolts, thereby enabling the bridge circuit shown in Fig. 6 to have a high output.

The transducer described above may be used as the basic part of such devices as pressure indicators, vibration detectors, meters for measuring the frequency of mechanical vibrations, weighing apparatus, sound range devices, microphones, torque meters or gauges, stress indicators, seismographs, stethoscopes and similar apparatus where a sound or mechanical vibration can be changed to its electrical image to advantage.

While I have shown and described certain embodiments of my invention, it is to be understood that it is capable of many modifications. Changes, therefore, in the construction and arrangement may be made without departing from the spirit and scope of the invention as disclosed in the appended claim.

I claim:

A transducer of the character described, comprising: first and second elongated flexible vibratory elements, each element having two substantially parallel plane flexing surfaces; means for mounting said vibratory elements at one end thereof, said elements having their free ends extending in the same direction and spaced a short distance from each other, the four flexing surfaces being substantially parallel; a thin, high resistance coating on each of said four parallel surfaces each of said coatings extending from the mounted end of the element toward the free end thereof and doubling back to the mounted end; plug-in terminals electrically connected to each end of said four resistance coatings; a pivot pin mounted on the free end of each of said vibratory elements, said pivot pins being co-axial and extending toward each other when said transducer is in neutral position; an elongated actuating arm readily removably secured between said pivot pins and extending outwardly therefrom, said actuating arm being adapted to transmit mechanical vibrations to said vibratory elements and having a direction of movement substantially normal to the planes of said resistance elements; and resilient damping means carried by said mounting means and impinging lightly on the free ends of said vibratory elements.

References Cited in the file of this patent

UNITED STATES PATENTS

| | | |
|---|---|---|
| 1,757,547 | Ruben | May 6, 1930 |
| 2,171,303 | De Forest | Aug. 29, 1939 |
| 2,359,245 | Ritzmann | Sept. 26, 1944 |
| 2,373,676 | Germeshausen | Apr. 17, 1945 |
| 2,380,514 | Germeshausen | July 31, 1945 |
| 2,471,601 | Albright | May 31, 1949 |

OTHER REFERENCES

Journal of Scientific Instruments, Aug. 1950, pp. 212–214, by Boggis.